United States Patent [19]
Uchihori et al.

[11] Patent Number: 5,996,014
[45] Date of Patent: Nov. 30, 1999

[54] DISTRIBUTION MULTIMEDIA SERVER SYSTEM USING SHARED DISK ARRAYS CONNECTED IN A CHAIN AND HAVING TWO PORTS EACH THAT ARE STRIPED WITH DIGITALIZED VIDEO DATA

[75] Inventors: Ikuo Uchihori, Tokyo; Shigehiro Asano, Yokosuka; Masayuki Takakuwa, Tokyo; Tatsunori Kanai, Yokohama, all of Japan

[73] Assignee: Kabushiki Kaisha Toshiba, Kawasaki, Japan

[21] Appl. No.: 08/959,844

[22] Filed: Oct. 29, 1997

[30] Foreign Application Priority Data

Oct. 30, 1996 [JP] Japan .................................. 8-288333

[51] Int. Cl.⁶ .................................................. G06F 13/00
[52] U.S. Cl. ........................ 709/226; 709/214; 709/215; 709/229
[58] Field of Search ..................................... 709/213, 214, 709/217, 226, 238, 229, 215, 102, 104, 105, 208; 395/183.04, 185.05, 182.04, 182.05, 182.06, 182.11; 707/10, 104, 204

[56] References Cited

U.S. PATENT DOCUMENTS

| | | |
|---|---|---|
| 5,502,836 | 3/1996 | Hale et al. .............................. 711/170 |
| 5,559,764 | 9/1996 | Chen et al. ................................ 369/30 |
| 5,719,983 | 2/1998 | Henderson et al. ...................... 386/70 |
| 5,724,539 | 3/1998 | Riggle et al. ............................ 711/100 |
| 5,768,623 | 6/1998 | Judd et al. ................................ 710/37 |
| 5,802,547 | 9/1998 | Legvold .................................. 711/100 |
| 5,862,403 | 1/1999 | Kanai et al. ............................. 395/826 |

Primary Examiner—Zarni Maung
Assistant Examiner—Jason D. Cardone
Attorney, Agent, or Firm—Oblon, Spivak, McClelland, Maier & Neustadt, P.C.

[57] ABSTRACT

The shared disk array which incorporates a plurality of disk apparatus storing the contents including the digitized video data and a plurality of element servers are connected to the shared channel network suitable for the multi-initiator architecture, whereby each of the element servers can physically share the shared disk array via the shared channel network. Further, each of the element servers is provided with the network interface suitable for the high-speed transmission and the band-width reservation, so that the contents stored in the shared disk array are read out in response to the request form the client, thus being output of the communication network via the network interface.

16 Claims, 10 Drawing Sheets

DISTRIBUTION MULTIMEDIA SERVER SYSTEM USING SHARED DISK ARRAYS CONNECTED IN A CHAIN AND HAVING TWO PORTS EACH THAT ARE STRIPED WITH DIGITALIZED VIDEO DATA

BACKGROUND OF THE INVENTION

The present invention relates to a storage sharing-type distribution multimedia server system which is capable of servicing with minimum copying by storage sharing when multiple accesses are made to the same contents.

A video server system may be used as a typical multimedia server system. One of the functions of the video server system is to provide a client with digitized video data stored in a storage, in response to a request from the client. In general, the video data are compressed, for example, using the MPEG (Moving Picture Experts Group) method, and are provided to the client at a given transfer rate corresponding to a reproducing time. To guarantee the transfer rate, the video server system often employs as the server's output, an ATM (Asynchronous Transfer Mode) network which can arbitrarily change the band-width (the speed of transferring information) during transferring. The ATM features transferring a mixture of voice data, moving picture data, and computer data. It divides any data into fixed-length data units of 48 bytes, and further adds a header of 5 bytes to the fixed-length data to prepare a cell of 53 bytes, thus switching in units of cells.

In order to realize such a video server system in the distribution-type model, a plurality of element servers, which manage the services of transferring necessary information in response to a request from a client share the contents of the information including the video data.

The loosely-coupled distribution-type server system in which the servers each have the disk array, occasionally does not share the contents at all. In this case, there is a drawback that the allotment of the processes and the distribution of the loads among the element servers, and the making of a backup copy are impossible because of the difference of the functions among the element servers. To solve the problem, each of the element servers holds a copy of the contents of the other element servers. However, allowing n element servers, for example, to hold all of the contents, requires storage n times larger than sharing the contents, which results in a cost disadvantage.

As stated above, it is significant to share the contents among the plurality of element servers in the distribution-type server system. However, in general, it is difficult to share the contents in a typical network distribution-type server system. The reason is as follows. Sharing the contents data via the network is theoretically possible. However, when sharing a large amount of data such as video data, the load over the network increases immensely. Particularly, since the video data requires continuity and stability thereof, it is essential to guarantee the transfer rate of data as described above.

Recently, a distribution system based upon a ATM network has been used to meet such a request.

As stated above, in the loosely-coupled distribution-type server system, sharing the contents is difficult, and the allotment of the processes, the distribution of the loads among the element servers, and the making of the backup copy cannot be readily realized. To attain this object, each of the element servers needs to hold the same contents. In other word, all of the contents need to be made with the same number of copies as the element servers. Such a system has the drawback that the storage capacity for storing the contents increases in proportion to the number of the element servers.

To solve this problem, there is a method of multiplexing only the contents that are frequently accessed, but not copying the contents that are rarely accessed. In this case, the algorithm of allotting the processes among the element servers is complicated with its reduced flexibility. Furthermore, even if applying the method, when a failure occurs in an element server which holds the contents that no copy thereof has been stored in the other element servers, the other element servers cannot make a copy of the contents.

In the distribution-type server system which employs the ATM network, when an element server is requested to deliver video data, for example, if the requested contents have been stored in a storage device physically connected to one of the other element servers, the element server must output the contents data after receiving them via the network. This function results in disadvantages in performance and cost by the transfer process between the element servers, and also the network might decrease in stability, which depends upon the load thereover.

BRIEF SUMMARY OF THE INVENTION

Therefore, it is an object of the present invention to provide a storage sharing-type distribution multimedia server system that can readily realize sharing of contents by physical sharing of a storage apparatus itself by each element server.

According to a first aspect of the present invention, a storage sharing-type distribution multimedia server system comprises a shared disk array which includes a plurality of disk apparatuses. Each disk apparatus stores contents having multimedia data. A plurality of element servers transfers information corresponding to a request from a client and includes a network interface which is connected to a communication network accommodating the client. The plurality of element servers reads the contents out of the shared disk array in accordance with the request from the client and outputs the contents to the communication network via the network interface. A shared channel network connects the plurality of element servers and the shared disk.

In the storage sharing-type distribution multimedia server system, each of the element servers can physically share the shared disk array via the shared channel network, that is, completely share the contents stored in each of the disk apparatuses of the shared disk array, thereby enabling allotment of processes, distribution of loads, and making of a backup copy, and also allowing effective use of the output performance of the whole shared disk array at the maximum performance of the shared channel network.

According to a second aspect of the present invention, in a storage sharing-type distribution multimedia server system, the plurality of disk apparatuses each are provided with two connection ports, wherein one of the connection ports is connected to a first shared channel network while the other is connected to a second shared channel network (which is independent of the first shared channel network), and two element server groups are respectively connected to the first and second shared channel networks.

The storage sharing-type distribution multimedia server system enables duplex configuration or dual configuration of the above system. Consequently, this allows access via both of the first shared channel network and the second shared channel network. Even though the output performance of the whole shared disk array exceeds the maximum performance of one shared channel network, each of the disk apparatuses can operate at its maximum. Furthermore, in case a failure occurs in one of the shared channel networks, it is possible to make a backup copy, thus enhancing system reliability.

According to a third aspect of the present invention, in a storage sharing-type distribution multimedia server system, the plurality of element servers include m (m denotes an integer greater than two) shared channel network interfaces, and share m shared disk arrays via m shared channel networks connecting to the m shared channel network interfaces. The storage sharing-type distribution multimedia server system enables each element server to share the sharing disk arrays, thereby realizing a large scale configuration.

According to a fourth aspect of the present invention, in a storage sharing-type distribution multimedia server system, which is a combination of the system according to the second aspect and the system according to the third aspect, the plurality of disk apparatuses include two connection ports. One of the two connection ports of each disk apparatus is connected to the first shared channel network, while the other is connected to the second shared channel network (which is independent of the first shared channel network). A first shared channel network group and a second shared channel network group respectively include a plurality of first shared channel networks and a plurality of second shared channel networks, and the two element server groups are respectively connected to the first and second shared channel network groups. The storage sharing-type distribution multimedia server system enables the duplex configuration or the dual configuration of the system according to the third aspect.

According to a fifth aspect of the present invention, in a storage sharing-type distribution multimedia server system, a plurality of systems according to the fourth aspect are connected to each other in a chain, which constructs a large scale configuration.

According to a sixth aspect of the present invention, in a storage sharing-type distribution multimedia server system, the storage sharing-type distribution multimedia server system according to the first, second, third, fourth, or fifth aspect, is constructed in such a fashion that the contents stored in the shared disk array or the m shared disk arrays are stored over the disk apparatuses constituting the disk array or each of the m disk arrays through striping, thereby maximizing per contents the number of users capable of simultaneously utilizing a service.

According to a seventh aspect of the present invention, in a storage sharing-type distribution multimedia server system, the storage sharing-type distribution multimedia server system according to the first, second, third, fourth, or fifth aspect, is constructed in such a fashion that the plurality of disk apparatuses constituting the shared disk array or the m shared disk arrays are classified into the same number of disk groups over the disk array or the m disk arrays as the plurality of element servers sharing the disk array or the m disk arrays, which respectively correspond to the plurality of element servers. Each of the contents is stored over all of the disk apparatuses in each of the disk groups through striping. The element servers ordinarily read the contents out of the respective disk groups, and when a failure occurs in an element server, inherit a disk group corresponding thereto.

Since the striping area in the storage sharing-type distribution multimedia server system is small in comparison with the system according to the sixth aspect, the waiting time from the request of the client to the permission of reading out the data block at the head of the contents is shorter.

According to an eighth aspect of the present invention, in a storage sharing-type distribution multimedia server system, the storage sharing-type distribution multimedia server system according to the first, second, third, fourth, or fifth aspect, is constructed in such a fashion that the plurality of disk apparatuses constituting the shared disk array or the m shared disk arrays are classified into a plurality of disk groups over the shared disk array or the m shared disk arrays. Each of the contents is stored over all of the disk apparatuses in each of the disk groups through striping. A specific element server or all of the plurality of element servers schedule accesses to each of the disk groups and select one of the disk groups for use in accordance with the contents requested by the client. Herein, each element server is provided with communication means for use in exchanging information among the element servers. A specific element server or all of the element servers hold information denoting usage conditions of each of the disk groups by communicating with the other element servers using the communication means, which enables scheduling of accesses to the disk groups based upon the information denoting the usage conditions.

In contrast to the system according to the seventh aspect, in the storage sharing-type distribution multimedia server system, the correspondence between each of the element servers and each of the disk groups is not fixed, thus enhancing the degree of freedom of distributing loads among the element servers. The system, however, requires frequent communication in order to schedule among the element servers, which gives a large overhead to inter-server scheduling.

A storage sharing-type distribution multimedia server system according to a ninth aspect of the present invention, reduces the overhead of inter-server scheduling, and further comprises a master scheduler which is connected to each element server via the communication means for use in exchanging information, schedules among the element servers, and allocates the request of the client among the element servers. Herein, the master scheduler preferably includes delivering means for delivering a timing signal for use in synchronizing the operations of all element servers to each other, and holding means for holding information denoting usage conditions of each disk group, whereby the master scheduler schedules accesses to the disk groups in synchronization with the timing signal and allocates the request of the client among the element servers.

DETAILED DESCRIPTION OF THE INVENTION

Hereinafter, the preferred embodiments according to the present invention applied to a video system, will be now described with reference to the accompanying drawings.

Figure 1:
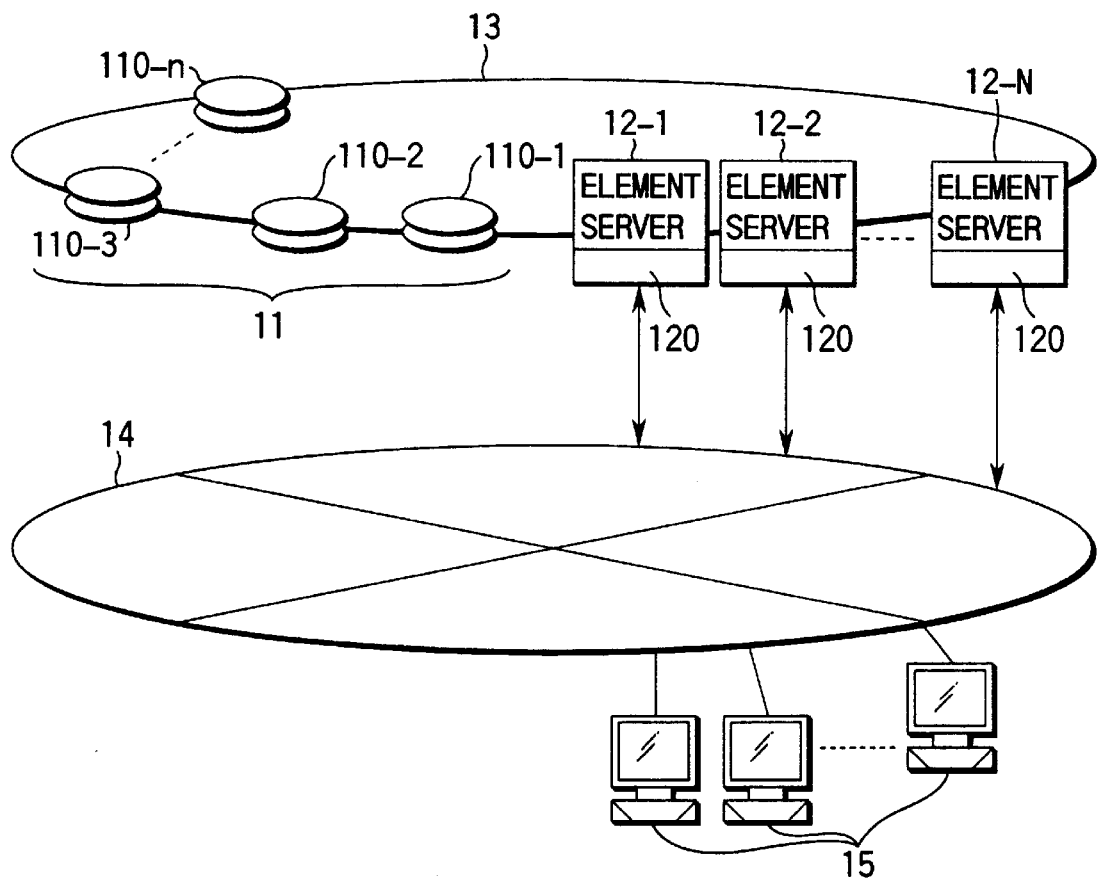
FIG. 1 is a block diagram showing the configuration of the storage sharing-type distribution video server system according to a first embodiment of the present invention.

FIG. 1 showing the first embodiment of a storage sharing-type distribution video server system according to the present invention.

The storage sharing type distribution video server system comprises a shared disk array 11, a plurality of element servers 12-1 to 12-N, a shared channel network 13, a communication network 14, a plurality of clients 15, and a plurality of network interfaces 120. The shared disks array 11 may include, for example, a RAID (Redundant Arrays of Inexpensive Disks). The element servers 12-1 to 12-N are connected to the shared disk array 11. Each of the plurality of element servers 12-1 to 12-N is connected to a communication network (the video distribution network) 14 via one of a plurality of high-speed network interfaces 120.

The shared disk array 11 includes a plurality of disk apparatuses 110-1 to 110-n. Each of the disk apparatuses 110-1 to 110-n stores therein the contents including the digitized video data (the data may be compressed through the MPEG method). The shared channel network 13 connecting each of the disk apparatuses 110-1 to 110-n and each of the element servers 12-1 to 12-N is an interface suitable for a multi-initiator architecture (the architecture which permits each server to act as the master) such as the FC-AL (Fiber Channel-Arbitrated Loop). The FC-AL enhances the performance of input/output transactions, as compared with the existing parallel SCSIs, such as SCSI (Small Computer System Interface), the FAST SCSI, and the WIDE SCSI. For example, the FC-AL can read and write a file of 4 kilobytes more than 4000 times a second. Employing the current WIDE SCSI allows inputting the outputting the same file 1500 times a second only. The features of the FC-AL are as following.

(1) It designates the destination using an absolute address. Therefore, in the case that a failure occurs in a hard disk apparatus, it is possible to continue the operation of the other hard disk apparatuses with no initialization of the whole system.

(2) It is possible to continue the operation regardless of a breakdown of a plurality of apparatuses.

(3) Since the point-to-point communication between arbitrary apparatuses (including the host computer) is available, it is easy to manage the system.

(4) It is possible to use a SCA (Single Connector Attachment for small SCSI Disk Drivers) connector identical with the parallel SCSI connector.

(5) It is possible to transfer data over a long distance, such as 10 kilometers.

(6) It can serve as both the interface and the network for an external storage apparatus.

The topology of the shared channel network 13 may be, for example, a loop connection. Alternatively, the shared channel network 13 may be a bus connection or a fabric connection (the HUB or the exchange network).

The element servers 12-1 to 12-N share the shared disk array 11 via the shared channel network 13. Responding to the request from each client 15 connected to the communication network 14, the element servers 12-1 to 12-N read the corresponding contents data out of the specific disk apparatus 110-i (i denotes one of 1 to n), and transfers them to the communication network 14 through the respective network interface 120 at a given transfer rate, for example. A communication scheme of high-speed transmission and free band-width reservation (arbitrary changing of the band-width (transfer rate of information) during transmission) is employed through the network interface 120. In one embodiment of the present invention the communication network 14 may be an ATM network or a CATV network (capable of distributing video data) via a headend, and the clients 15 may be computers connected to the communication network 14 or set-top-boxes (STB) connected to the cable of the CATV.

In the storage sharing-type distribution video server system of FIG. 1, since the element servers 12-1 to 12-N share the shared disk array 11 via the shared channel network 13, that is, completely share the contents (for example, of video data) stored in the disk apparatus 110-1 to 110-n, each client 15 does not recognize any difference in function of the element servers 12-1 to 12-N. Accordingly, the load distribution can be realized by constructing the system in such a manner that each client 15 inquires about the load conditions of the element servers 12-1 to 12-N and sends a request to the element server depending on load condition, such as the element server 12 which is burdened with the least load. In one embodiment of the present invention, one of the element servers 12-1 to 12-N always determines the load conditions of the element servers 12-1 to 12-N as the master, and each client 15 inquires about the load conditions of the elements servers 12-1 to 12-N from the master.

In addition, in the distribution video server system of FIG. 1, since the contents are shared by the plurality of element servers 12-1 to 12-N, whichever one of the element servers 12-1 to 12-N breaks, the system can preserve the function perfectly although the performance of the whole system declines. Further, making a backup copy in terms of the contents and the function, can be realized by adding beforehand an element server acting for hot standby to the element servers 12-1 to 12-N.

Figure 2:
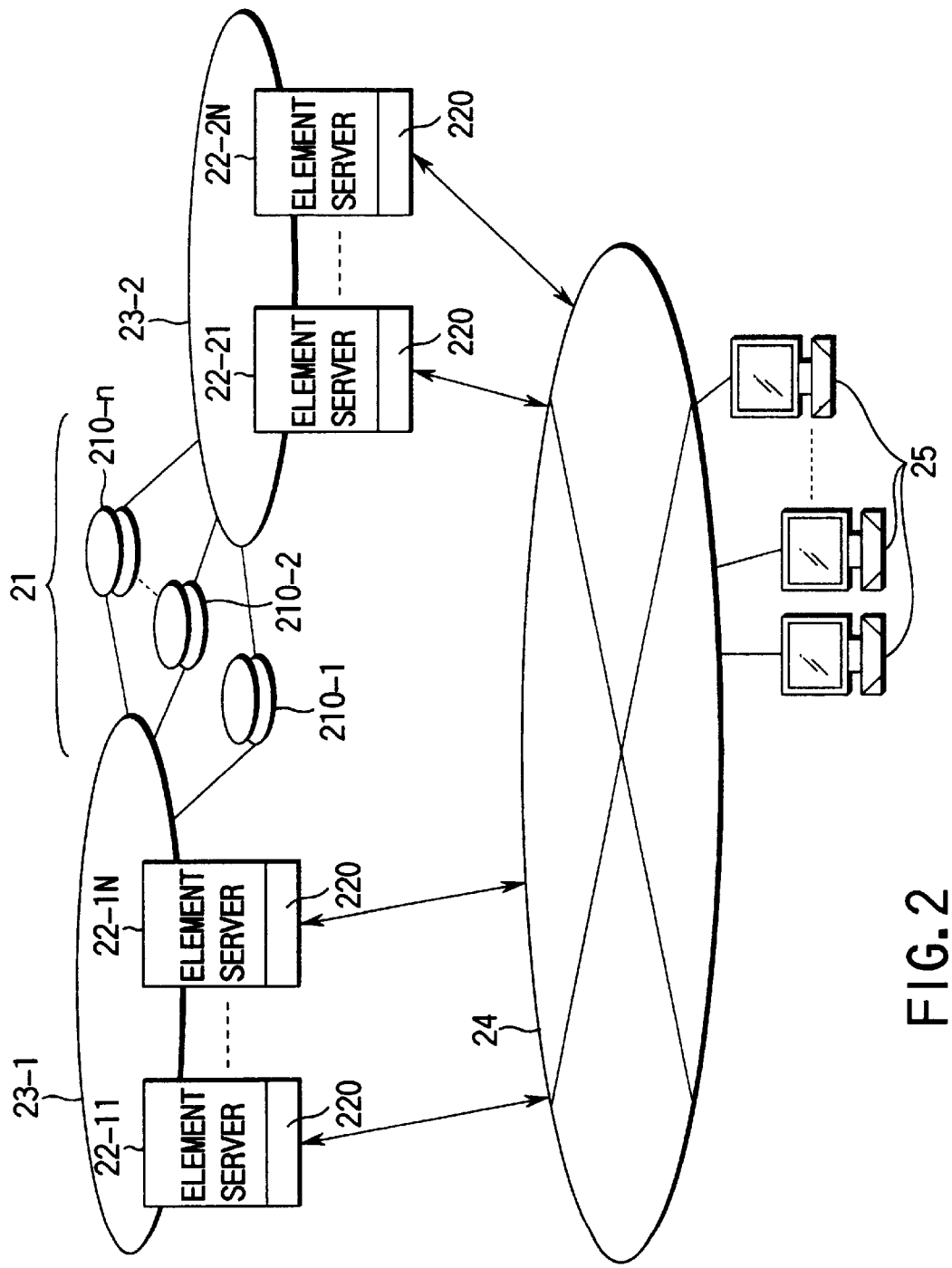
FIG. 2 is a block diagram showing the configuration of the storage sharing-type distribution video server system according to a second embodiment of the present invention.

FIG. 2 shows the configuration of a second preferred embodiment of the storage sharing-type distribution video server system according to the present invention, which includes improvements of the first embodiment of FIG. 1.

In general, some disk apparatuses for the FC-AL are provided with two ports for duplex. Typically, the duplex of the interface at a server side is accomplished through connection of the server using a plurality of interfaces, thereby enhancing the reliability of the disk apparatus. On the contrary, in this embodiment, connecting the two ports of the disk apparatus to the two independent shared channel networks equivalent to the shared channel network 13 in FIG. 1, enables the two shared channel networks to share the disk apparatus.

More specifically, in the storage sharing-type distribution video server system in FIG. 2, the storage sharing-type distribution video server system comprises a shared disk array 21, a first plurality of element servers 22-11 to 22-1N, a second plurality of element servers 22-21 to 22-2N, first and second shared channel networks 23-1 and 23-2, a communication network 24, a plurality of clients 25 and a plurality of network interfaces 220. The shared disk array 21 comprises a plurality of disk apparatuses 210-1 to 210-n. Each disk apparatus includes first and second connection ports wherein each of the first connection ports of the disk apparatuses 210-1 to 210-n is connected to the first shared channel network 23-1 and each of the second connection ports thereof is connected to the second shared channel network 23-2. The element servers 22-11 to 22-IN are connected to the first shared channel network 23-1, and the element servers 22-11 to 22-1N are connected to the first shared channel network 23-1, and the element servers 22-21 to 22-2N are connected to the second shared channel network 23-2. Each of the element servers 22-11 to 22-1N to 22-2N is connected to the communication network 24 via a respective network interface 220.

In the distribution video server system of FIG. 2, since the shared disk array 21 is accessible from both of the shared channel networks 23-1 and 23-2, even if the whole output performance of the sharing disk array 21 exceeds the performance of each of the shared channel networks 23-1 and 23-2, each of the disk apparatuses 210-1 to 210-n can execute the operation at its maximum. Furthermore, even if a failure occurs in one of the shared channel networks 23-1 and 23-2, the other can operate as a backup, that is, each client 25 connected to the communication network 24 is capable of sending a request to an element server 22 over the normal shared channel network 23, thus preserving the reliability of the system.

In this way, in comparison with the server system in FIG. 1 the server system in FIG. 2 can realize the duplex configuration (the configuration that one of the shared channel networks 23-1 and 23-2 waits as the hot standby), and the double configuration (the configuration that both of the shared channel networks 23-1 and 23-2 operate).

Figure 3:
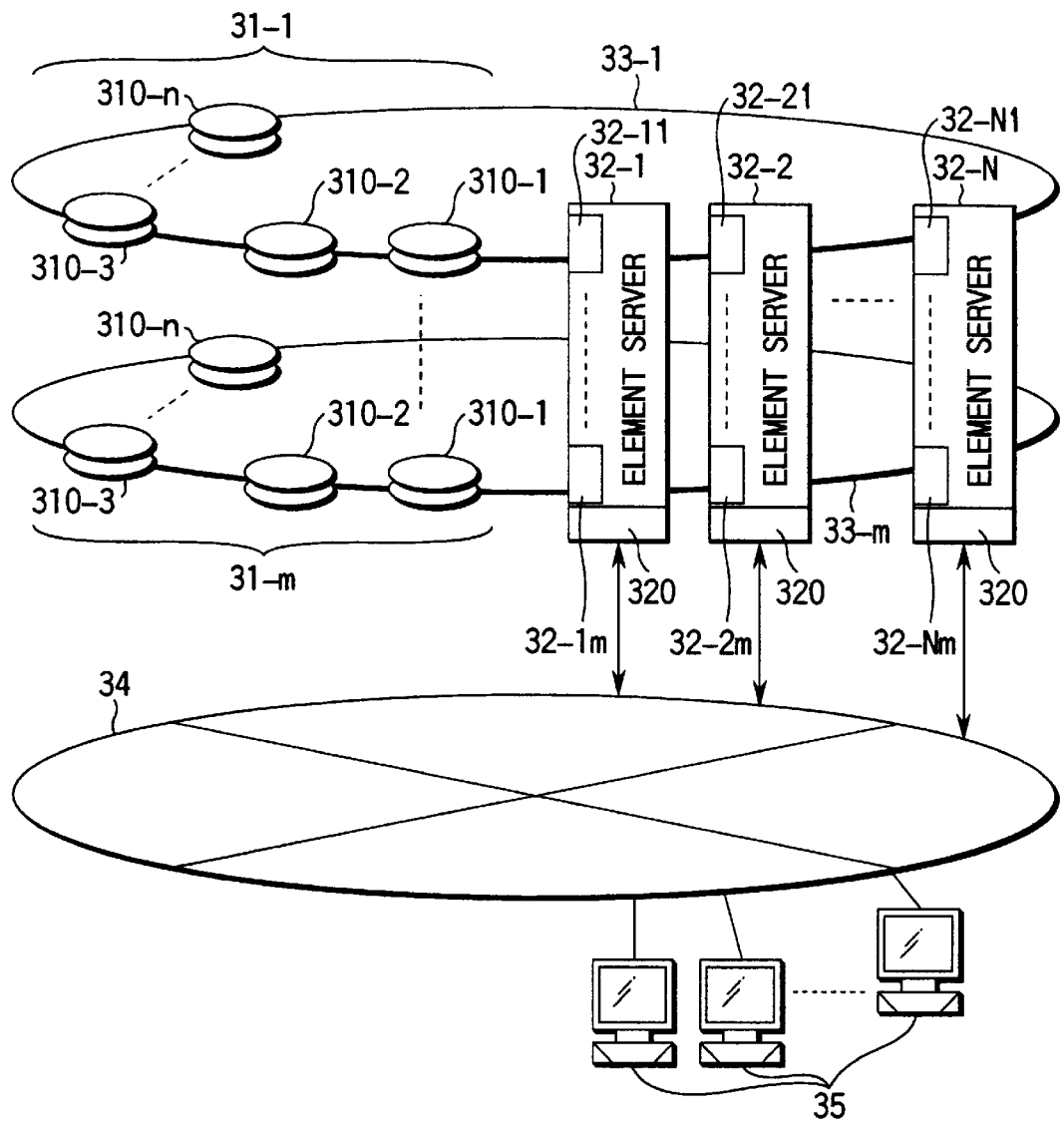
FIG. 3 is a block diagram showing the configuration of the storage sharing-type distribution video server system according to the third embodiment of the present invention.

FIG. 3 shows the configuration of a third preferred embodiment of the storage sharing-type distribution video server system according to the present invention, which includes improvements of the first embodiment of FIG. 1. The storage sharing-type distribution server system comprises a plurality of shared disk arrays 31-1 to 31-m, a plurality of element servers 32-1 to 32-N, a plurality of shared channel networks 33-1 to 33-m, an information delivery network 34, a plurality of clients 35, and a plurality of network interfaces 320.

In FIG. 3, each of the element servers 32-1 to 32-N includes respective m(m denotes an integer two greater) storage interfaces 32-11 to 32-Nm, and is connected to the shared channel networks 33-1 to 33-m which are each provided with the independent interface suitable for the multi-initiator architecture. Also, each of the element servers 32-1 to 32-N is connected to the communication network 34 via a respective network interface 320.

Each of the shared channel networks 33-1 to 33-m is connected to the shared disk arrays 31-1 to 31-m, respectively. Each of the shared disk arrays 31-i (i=1 to m) includes a plurality of disk apparatuses 310-1 to 310-n.

In the distribution video server system of FIG. 3, the m shared disk arrays 31-1 to 31-m appear to each of the element servers 32-1 to 32-N to be a large scale shared disk array. In addition, each of the shared disk arrays 31-1 to 31-m is not connected to only one shared channel network but is connected to the m independent sharing channel networks 33-1 to 33-m storage sharing distribution. Even if the total output performance of the shared disk arrays 31-1 to 31-m is m times the performance of the system in FIG. 1, it is possible to construct the distribution video server system which shares larger contents, by increasing the number N of the element servers 32-1 to 32-N so as to correspond with the number m.

Figure 4:
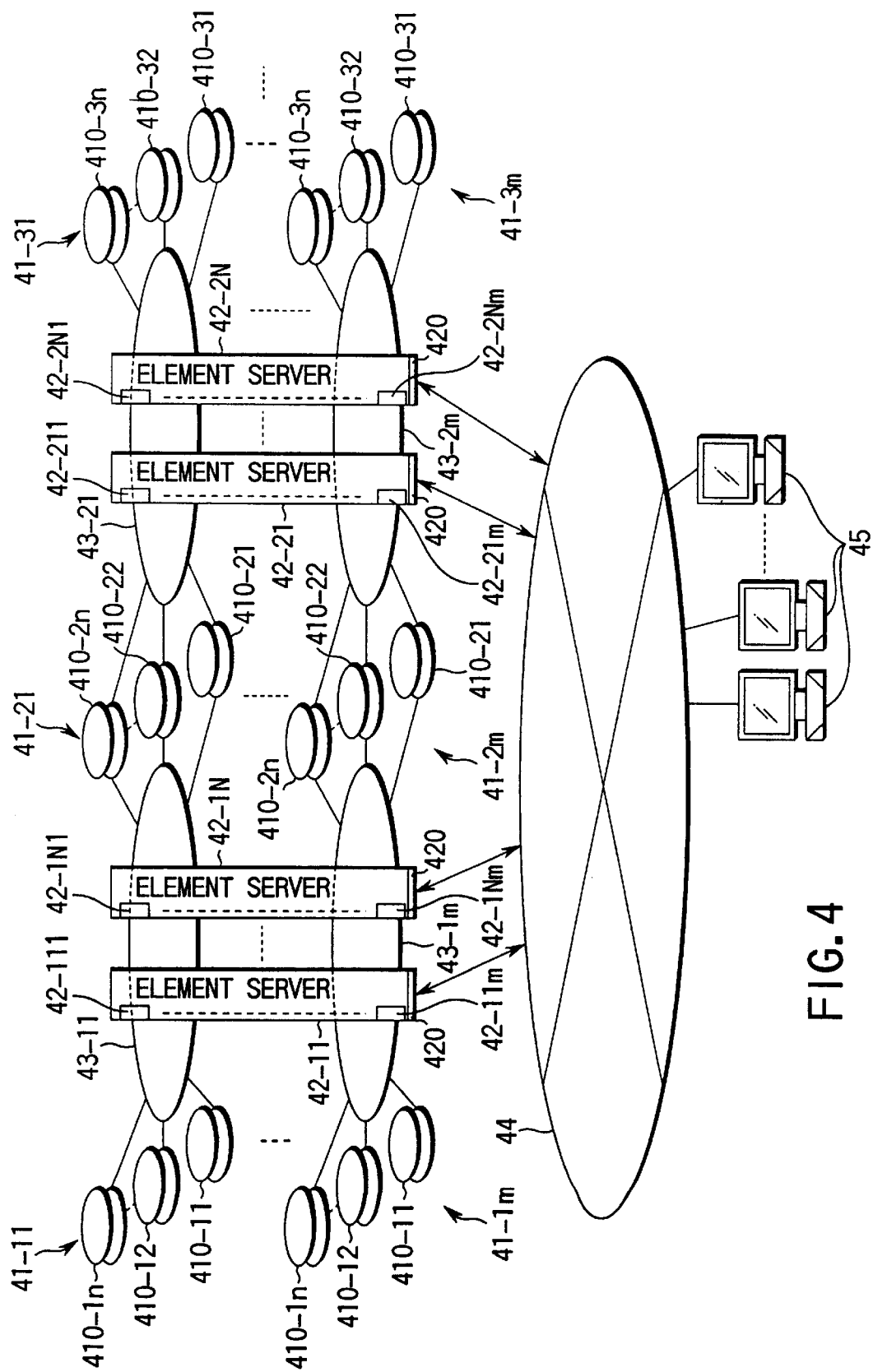
FIG. 4 is a block diagram showing the configuration of the storage sharing-type distribution video server system according to a fourth embodiment of the present invention.

FIG. 4 shows the configuration of a fourth preferred embodiment of the storage sharing-type distribution video server system according to the present invention, which is the combination of the configuration in FIG. 2 and the configuration in FIG. 3. The storage sharing type distribution video server system comprises a plurality of shared disk arrays 41-11 to 41-1m, 41-21 to 41-2m, and 41-31 to 41-3m, a plurality of element servers 42-11 to 42-1N, 42-21 to 42-2N, a plurality of shared channel networks 43-11 to 43-1m and 43-21 to 43-2m, a communication network 44, a plurality of clients 45, and a plurality of network interfaces 420.

In FIG. 4, each of the element serves 42-11 to 42-1N includes the respective m (m denotes an integer two or greater) storage interfaces 42-111 to 42-11m through 42-1N1 to 42-1Nm, and is connected to the shared channel networks 43-11 to 43-1m having an independent interface suitable for the multi-initiator architecture via the respective storage interface 42-111 to 42-1Nm. Each of the shared channel networks 43-11 to 43-1m is connected to the respective one of the shared disk arrays 41-21 to 41-2m.

On the other hand, each of the element servers 42-21 to 42-2N include in storage interfaces 42-211 to 42-21m though 42-2N1 to 42-2Nm, and are connected therethrough to the shared channel networks 43-21 to 43-2m (which are the similar to shared channel networks 43-11 to 43-1m). The shared channel networks 43-21 to 43-2m are connected to the shared disk arrays 41-21 to 41-2m.

Each of the shared disk arrays 41-2i (i=1 to m) comprises a plurality of disk apparatuses 410-21 to 410-2n each including first and second connection ports, wherein each of the first connection ports of the shared disk apparatuses 410-21 to 410-2n is connected to the shared channel network 43-1i while each of the second connection ports thereof is connected to the shared channel network 43-2i. Also, each of the element servers 42-11 to 42-1N and 42-21 to 42-2n is connected to the communication network 44 via a respective network interface 420.

Consequently, as compared with the configuration in FIG. 3, the duplex configuration and the double configuration can be realized, whereby each client 45 over the communication network 44 can utilize the contents in the shared disk arrays 41-21 to 41-2m via one of the element servers 42-11 to 42-1N or one of the element servers 43-11 to 43-2N.

In the system of FIG. 4, in addition to the above shared disk arrays 41-21 to 41-2m, the shared disk arrays 41-11 to 41-1m, are connected to the shared channel networks 43-11 to 43-1m. Each of the shared disk arrays 41-11 to 41-m includes a plurality of disk apparatuses 410-11 to 410-1n including first and second communication ports, wherein each of the second communication ports of the disk apparatuses 410-11 to 410-1n in connected to the respective shared channel networks 43-11 to 43-1n.

On the other hand, in addition to the above shared disk arrays 41-21 to 41-2m, the shared disk arrays 41-31 to 41-3m are connected to the shared channel networks 43-21 to 43-2m. Each of the shared disk arrays 41-3i (i=1 to m) includes a plurality of disk apparatuses 410-31 to 410-3n each having first and second ports, wherein each of the first ports of the disk apparatuses 410-31 to 410-3n is connected to the shared channel networks 43-2i.

In this configuration, each client 45 over the communication network 44 can use the contents in the sharing arrays 41-11 to 41-1m via one of the element servers 42-11 to 42-1N, and can also use the contents in the shared disk arrays 41-31 to 41-3m via one of the element servers 42-21 to 42-2N.

As apparent in the configuration of FIG. 4, the alternate configuration is available that a plurality of element servers 42-j1 to 42-jN (j=1, 2, . . . ) are commonly connected to the shared channel networks 43-j1 to 43-jm and further the unit configurations of connecting thereto the respective shared disk arrays 41-1j to 41-jm are connected to each other via the shared disk arrays 41-1j to 41-jm like a chain.

In addition, assume that the combination of the element servers 42-11 to 42-1N, the shared disk arrays 41-11 to 41-1m, and the shared channel networks 43-11 to 43-1m are a unit configuration No. 1, and the combination of the element servers 42-21 to 42-2N, the shared disk arrays 41-21 to 41-2m, and the shared channel networks 43-21 to 43-2m are a unit configuration No. 2. Connecting the unit configuration No. 1 and the unit configuration No. 2 is equivalent to connecting the sharing disk arrays 41-21 to 41-2m of the unit configuration No. 2 to the shared channel networks 43-11 to 43-1m of the unit configuration No. 1, and more specifically, is equivalent to connecting the first ports of the disk apparatuses 410-21 to 410-2n constituting the shared disk arrays 41-2i of the unit configuration No. 2 to each of the shared channel networks 43-1i (i=1 to m) of the unit configuration No. 1.

Thus, it is possible to construct the distribution server groups which are partly three-multiplexed. In this case, however, a distribution server and another distribution server not adjacent thereto do not share the contents.

The first to fourth embodiments described above illustrate the distribution video server system that physically shares the disk apparatus (the storage); in the typical video server system, each of the contents commonly undergoes striping (storing data in a plurality of hard disk apparatus) over a plurality of disk apparatuses. More specifically, the first several frames of the video data are stored in the first disk apparatus, the following several frames are stored in the second disk apparatus, and similarly storing is sequentially repeated, whereby the first disk apparatus is employed again upon reaching to the final disk apparatus. Further, each of the data blocks which has experienced striping, which completes reading in a given period of time, has the scheduling of reading out of the disk apparatus, in general.

Hereinbelow, the fifth to the eighth preferred embodiments, in which the storage sharing-type distribution video server system of the first preferred embodiment further includes the function of scheduling the disk apparatuses, will be described in turn. In addition to the combination with the first embodiment, the scheduling of the disk apparatus can be combined with the second to fourth embodiments. In this case, since the resource such as the band-width of each disk apparatus and shared channel network is limited, managing the disk apparatuses requires scheduling among plurality of element servers. As the communication path are employed, for example, the following methods: preparing the communication among the element servers which is independent of the disk access to the shared channel network (which is possible when employing the FC-AL), connecting pursuant to the network, such as Ethernet, and preparing the dedicated interface.

Among the methods of installing the scheduling, there is a method that a specific element server manages the resource such as the band-width of the disk apparatus and the shared channel interface as the master. In this case, only the master may accept the request from the client to allocate it to the element servers, and an arbitrary element server may accept the request to inquire the resource conditions of the master. Also, with no master, each of the element servers may hold all of the resource information, and broadcast them to another element server which intends to use the resource, thereby allowing the coincidence of the information.

Figure 5A:
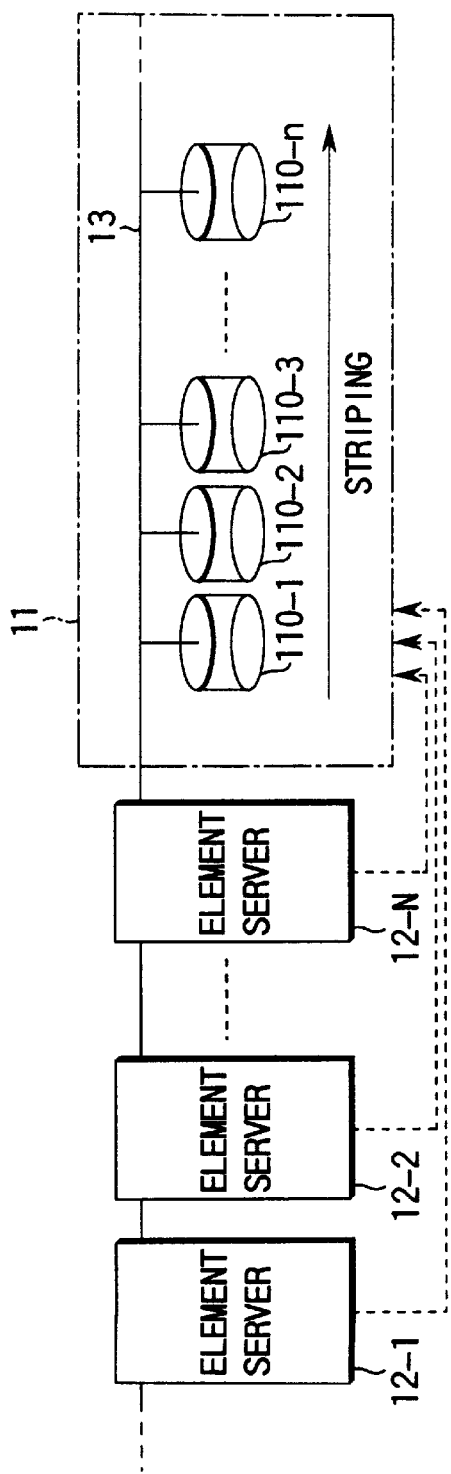
FIGS. 5A and 5B are block diagrams showing the configuration of the storage sharing-type distribution video server system of FIG. 1 having the scheduling function of the disk apparatus according to a fifth embodiment of the present invention, and an example of striping.
Figure 5B:
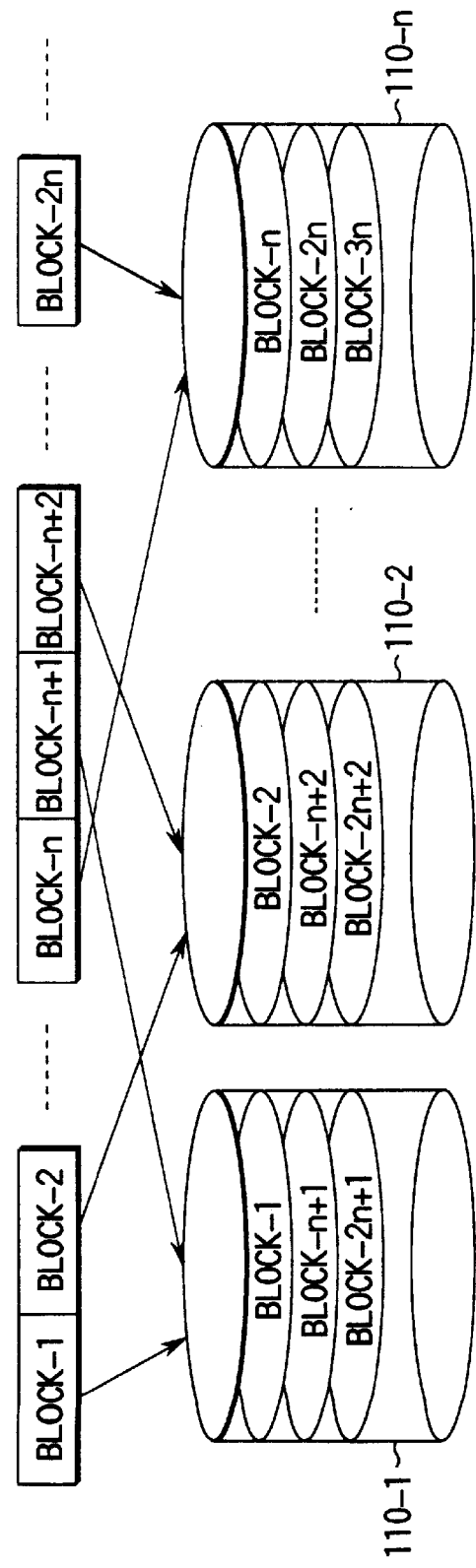

FIGS. 5A and 5B show the fifth preferred embodiment according to the present invention, in which all of the contents are subjected to striping over the disk apparatuses 110-1 to 110-n (in the sharing disk array 11) connected to the shared channel network 13 in FIG. 1, and are shared by the element servers 12-1 to 12-n.

The embodiments of FIGS. 5A and 5B maximize the number of users (the number of the clients 15 in FIG. 1) that can simultaneously utilize the service for each of the contents. Assuming that one of the contents has been stored in one of the disk apparatus 110-i (i=1 to n), the number of the users that can simultaneously utilize the service using the contents, depends upon the output performance of the disk apparatuses 110-i itself. As shown in FIGS. 5A and 5B, by striping one of the contents over the n disk apparatus 110-1 to 110-n as the blocks 1 (block-1) to n (block-n) and the blocks n+1 (block-n+1) to 2n (block-2n), the number of the users that can simultaneously utilize the service reaches n times as many as the storing in one disk apparatus.

Figure 6:
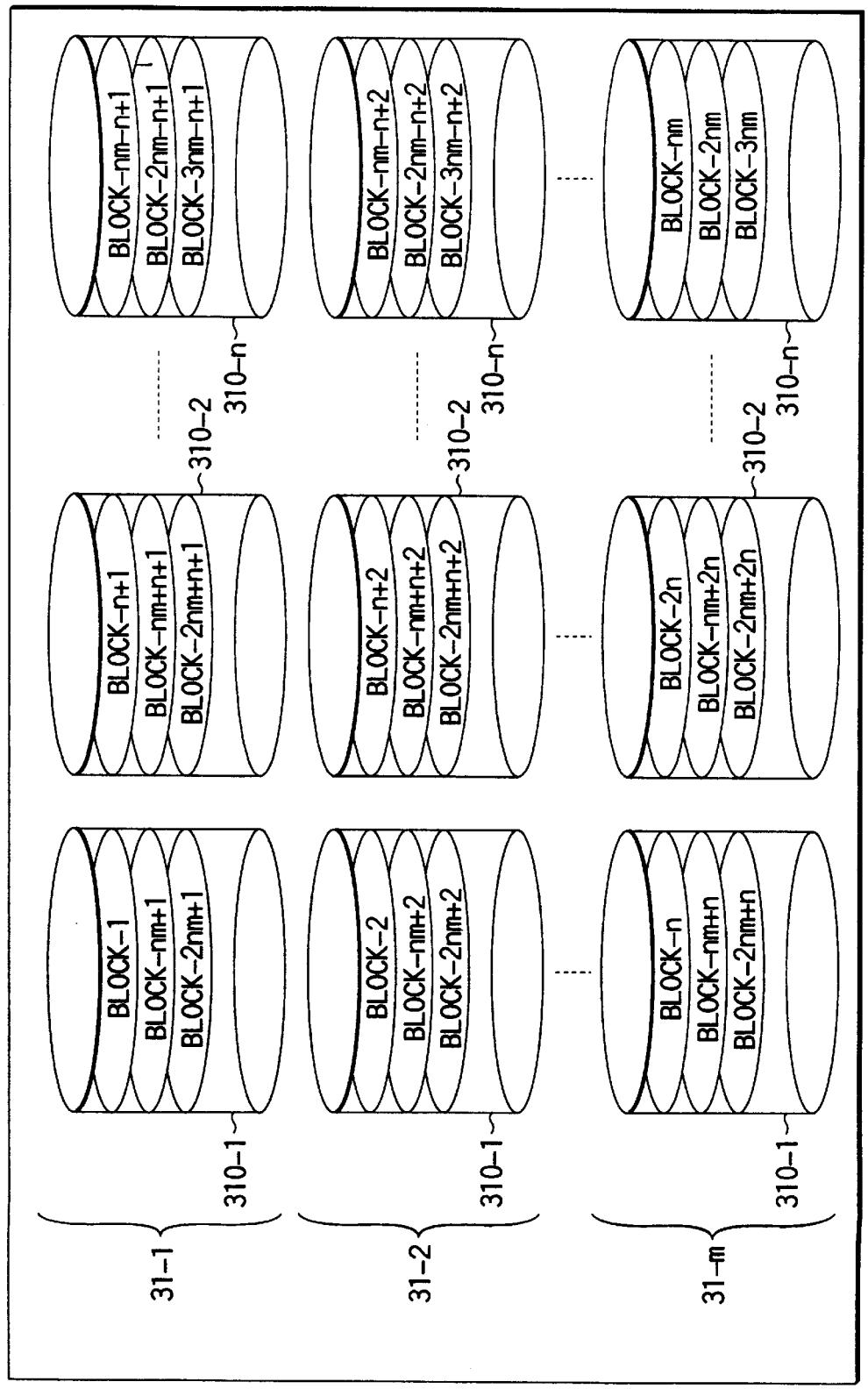
FIG. 6 is a block diagram showing an example of applying the configuration of FIG. 5 to the distribution server system of FIG. 3 and striping over the sharing channel networks.

FIG. 6 shows the striping for the storage sharing-type distribution video server system of FIG. 3 according to the present invention. By applying the striping of FIGS. 5A and 5B to the distribution server system in FIG. 3, data is striped over all of the shared channel networks 33-1 to 33-m. Specifically, data is striped over the disk apparatuses 310-1 to 310-n that constitute the respective shared disk arrays 31-1 to 31-m (which are connected to the shared channel networks 33-1 to 33-m). Thus, the number of the users who can simultaneously utilize the service reaches n by m times the number of users of a single disk apparatus.

However, the scheduling of reading out of the disk apparatus in the configuration in FIGS. 5A and 5B (or in FIG. 6) raises a problem that the waiting period of time, from the request by a user to the permission to read the data block in the header of the contents, reaches a maximum.

Assume now that video data of 4 Mbps now is serviced by using hard disk drives (HDDs) whose data read access speed is about 2MB/S.

Figure 6A:
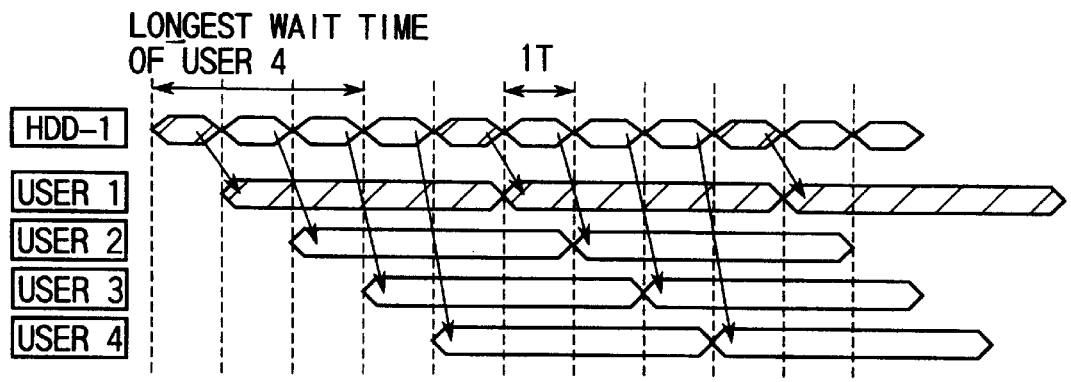
FIG. 6A is a timing diagram illustrating the timing of user accesses to a single disk apparatus.

If a single HDD is used, the data read access speed of 2MB/S (=16 Mbps) can service the video data to approximately four users. A relation between the data read access from the HDD and the reproduction of the video data is shown in FIG. 6A since the video data must be supplied without interruption. As is apparent from FIG. 6A, when a fourth user is to receive the service while the remaining three users are already receiving the service, the fourth user waits a time period of 3T at worst.

Figure 6B:
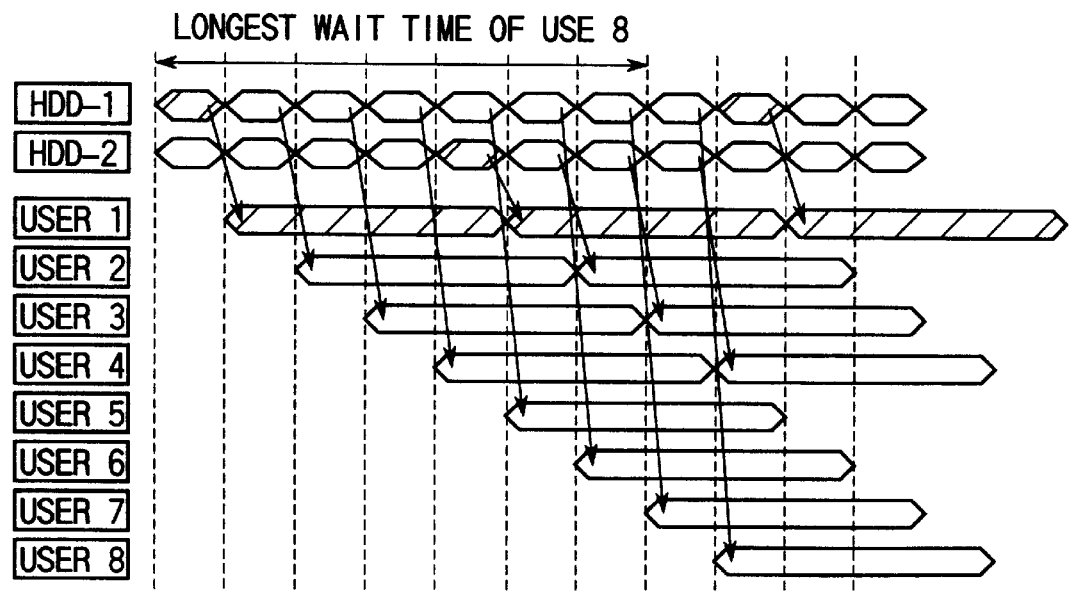
FIG. 6B is a timing diagram illustrating the timing of user accesses to a multiple disk apparatus.

The use of two HDDs with the striping method services video data simply to eight users. The striping method is such that certain data is divided into a predetermined unit such as d0, d1 d2, d3 . . . . The divided data d0, d2, . . . d(2n) are stored in HDD (0) and the divided data d1, d3, . . . d(2n−1) are stored in HDD (1) when two HDDs are used. A relation between the data read access from the HDDs and the reproduction of the video data is shown in FIG. 6B. The video data is divided and stored in two HDDs but the head data of the video data is stored only in one of the HDDs. Therefore, if an eighth user is to receive the service while the remaining seven users are receiving the service, the eighth user waits a time period of 7T at the longest. In other words, the wait time for receiving the head data increases as the number of HDDs increases.

For a video server, the time 1T is normally approximately 10 ms. Accordingly, if the number of HDDs is small, the wait time is negligible. However, as the number of HDDs is increased, the wait time of a user that issued a service request increases. This increased wait time may be critical depending on an application.

Moreover, although the number of the disk apparatuses connected to the server system can preferably increase in accordance with the service scale, adding one disk apparatus to the current disk apparatuses among which the contents are distributed, requires another striping, which may be troublesome.

Figure 7:
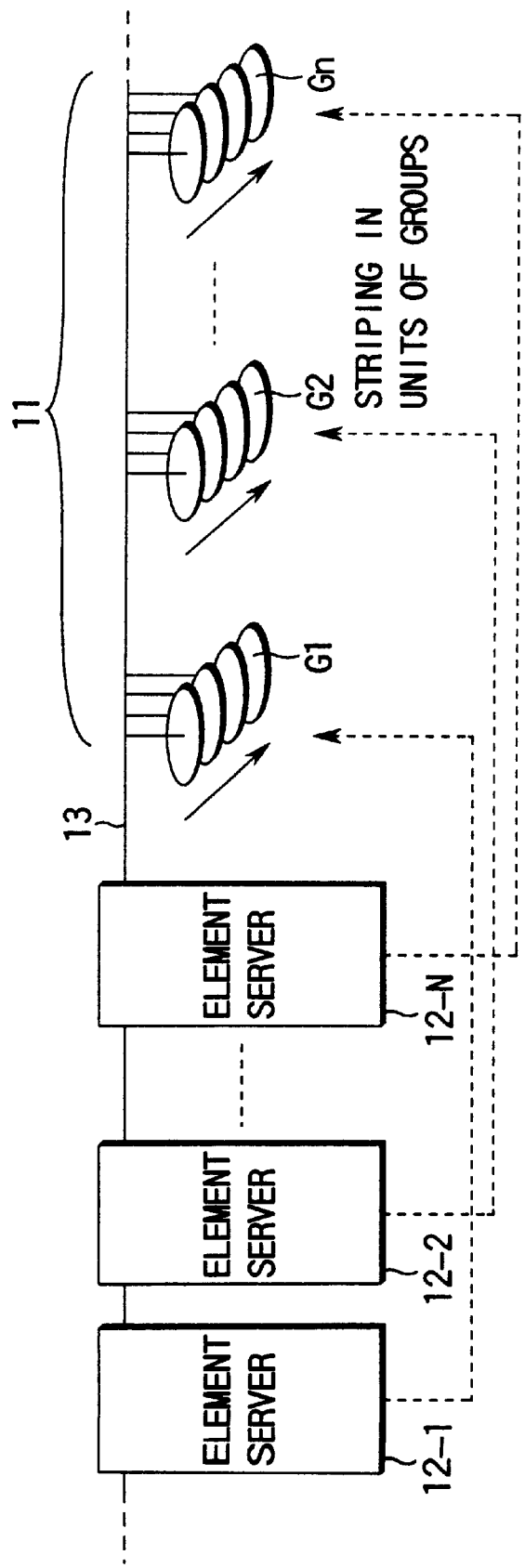
FIG. 7 is a block diagram showing the configuration of the storage sharing-type distribution server system of FIG. 1 having a scheduling function of the disk apparatus according to a sixth embodiment of the present invention.

FIG. 7 shows a sixth preferred embodiment, wherein in order to reduce waiting time of users, the disk apparatuses are grouped by an appropriate number, and the scheduling is executed within each of the groups.

In FIG. 7, the disk apparatuses 110-1 to 110-n (in the shared disk array 11) connected to the shared channel network 13 in FIG. 1 are classified into the same number N of groups (disk groups G1 to Gn as the element servers 12-1 to 12-N, wherein the striping is performed in units of groups G1 to Gn.

In the embodiment in FIG. 7, each of the element servers 12-1 to 12-N corresponds to the respective disk groups G1 to Gn, whereby a disk group Gi (i=1 to N) can be accessed by only the corresponding element server 12-i. When one of the element servers 12-1 to 12-n breaks, another element server wholly inherits the disk group corresponding to the broken element server, which permits the service of the contents stored in the disk group.

The embodiment in FIG. 7 solves the problems such as the waiting period of time and the add-on of an additional disk apparatus in FIGS. 5A and 5B (or in FIG. 6). More specifically, as compared with the functions in FIGS. 5A and 5B (or in FIG. 6), the configuration in FIG. 7 reduces the area for striping, thus decreasing the waiting time. Also, adding on additional units of group Gi does not require any further striping of the contents. Furthermore, the scheduling among the element servers 12-1 to 12-N is advantageous in extremely loose coupling. The communication among the element servers 12-1 to 12-N is practically unnecessary in the normal operation, thereby requiring no overhead of the communication and simplifying the logic thereof.

On the contrary, the element servers 12-1 to 12-N correspond to the respective disk groups G1 to GN; therefore, in light of the load distribution among the element servers 12-1 to 12-N, the degree of freedom thereof is small, so that the number of the users who can simultaneously utilize the service related to one of the contents depends upon the load of the element server which holds that contents. This has the drawback that even though the resource in a disk apparatus is available, the element server managing the resource, if busy in servicing other contents, cannot provide the service relevant to the resource.

Figure 8:
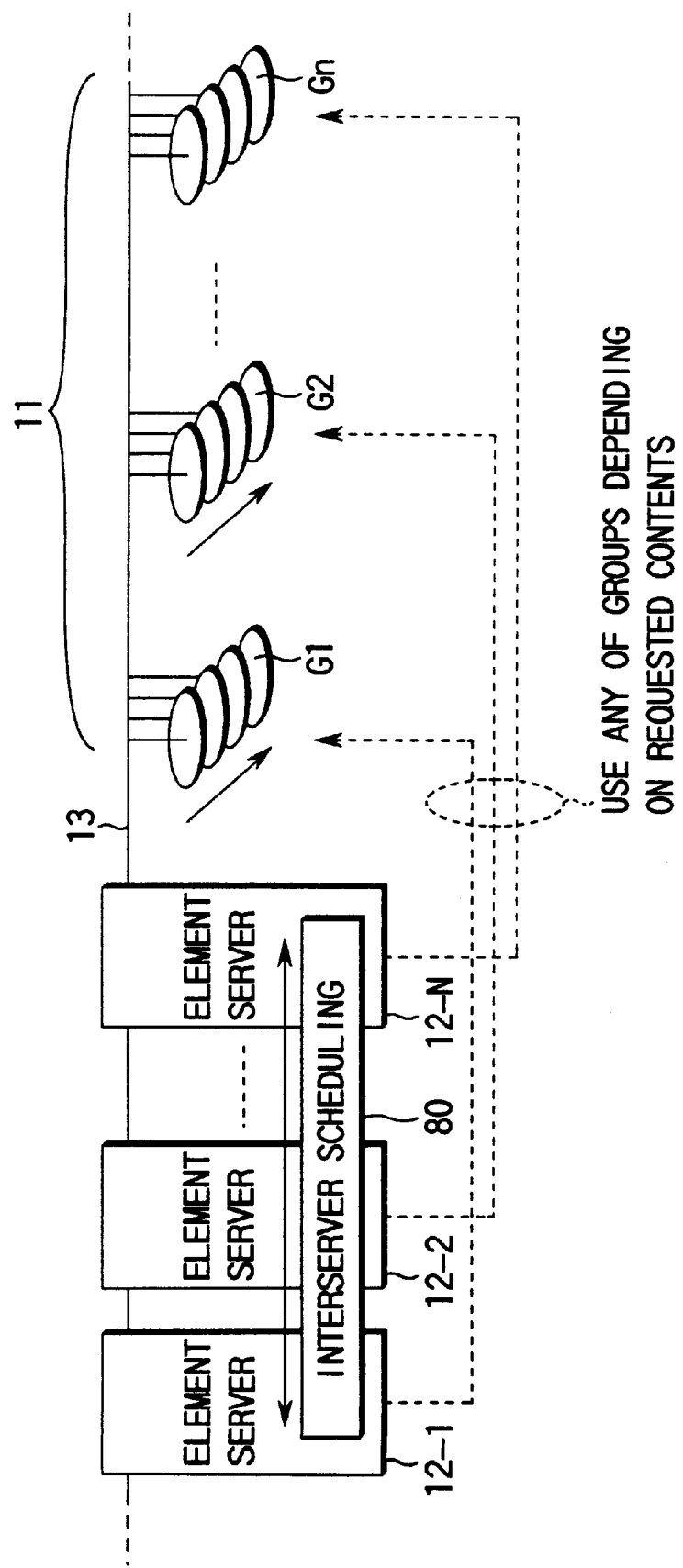
FIG. 8 is a block diagram showing the configuration of the storage sharing-type distribution server system of FIG. 1 having a scheduling function of the disk apparatus according to a seventh embodiment of the present invention.

FIG. 8 shows a seventh preferred embodiment, which has improvements to the embodiment of FIG. 7.

The embodiment of FIG. 8 is similar to the embodiment of FIG. 7 in that the disk apparatuses 110-1 to 110-n (in the shared disk array 11) connected to the shared channel network 13, are classified into the same number of disk groups G1 to Gn as the element servers 12-1 to 12-N and the striping is executed with each of the disk groups, while differing in that the correspondence between the disk groups G1 and Gn and the element servers 12-1 to 12-n is not fixed. More specifically, in the embodiment of FIG. 8, which disk group Gj (j=1 to n) an element server 12-i (i=1 to N) accesses depends upon the requested contents. That is, the dynamic allocation is implemented in accordance with the user's request.

Therefore, the system in the embodiment of FIG. 8 includes an inter-server scheduling unit 80 which schedules among the element servers 12-1 to 12-N via the shared channel network 13. In this embodiment, each of the element servers 12-1 to 12-N holds the information denoting the usage conditions of the disk groups G1 to Gn by frequent communication among the element servers 12-1 to 12-N through the inter-server scheduling unit 80, such as a notification of the service that each thereof provides. Accordingly, the overhead in inter-server scheduling is large. However, this gives a large degree of freedom, whereby an arbitrary element server can provide the service related to an arbitrary contents if the resource in the disk apparatus is available.

The embodiment of FIG. 8, classifies the disk apparatuses 110-1 to 110-n into the same number N of groups (disk groups) G1 to Gn as the element servers 12-1 to 12-N similarly to the embodiment of FIG. 7. The embodiment of FIG. 8 does not always require as many groups as the element servers 12-1 to 12-N, because the correspondence between the disk groups G1 to Gn and the element servers is not fixed, in contrast to the embodiment of FIG. 7.

Figure 9:
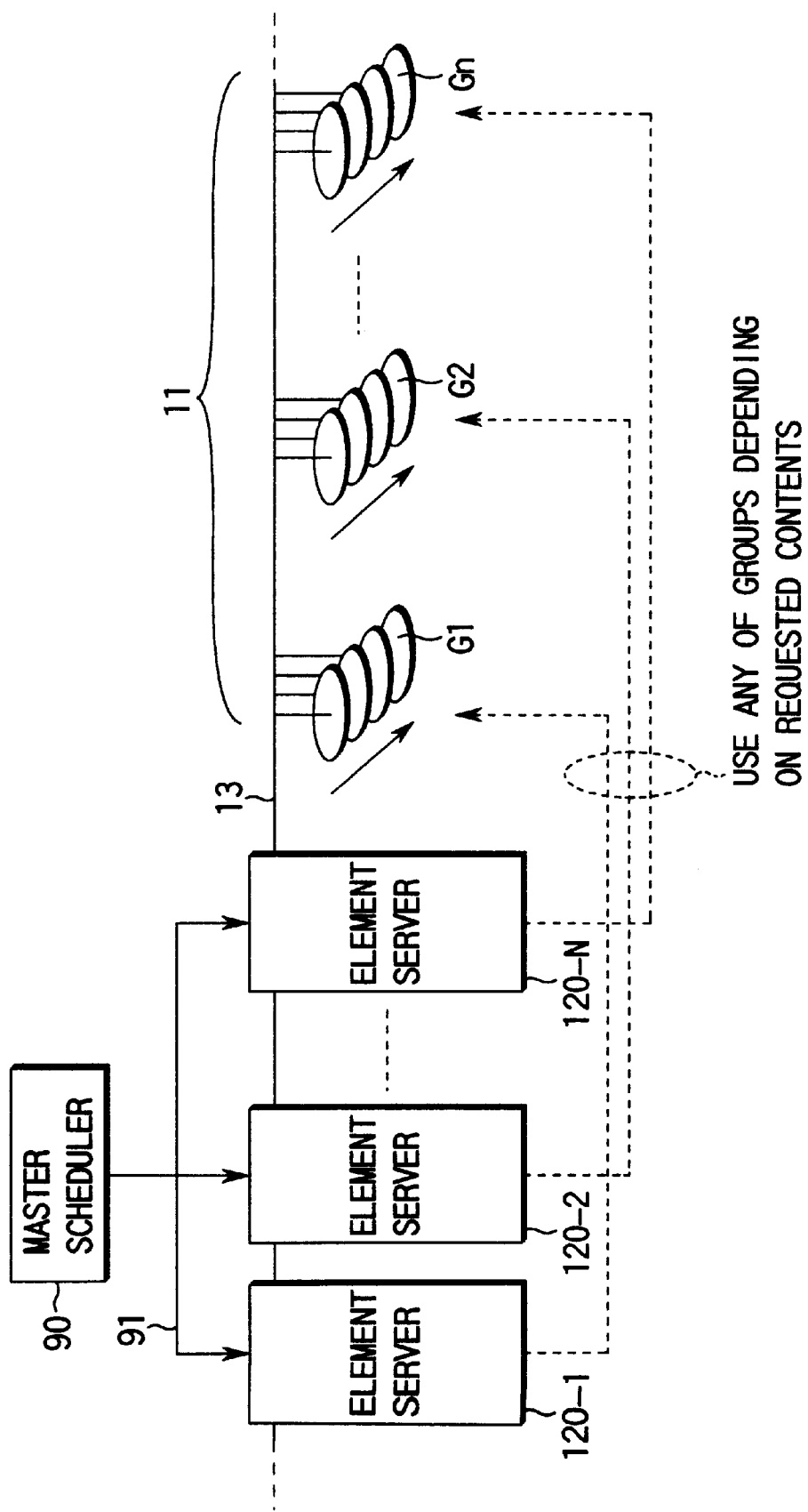
FIG. 9 is a block diagram showing the configuration of the storage sharing-type distribution server system of FIG. 1 having a scheduling function of the disk apparatus according to an eighth embodiment of the present invention.

FIG. 9 shows an eighth preferred embodiment that reduces the overhead of scheduling among the element servers, to reduce the limitation of the embodiment of FIG. 8.

The system in the embodiment of FIG. 9 further comprises a dedicated master scheduler 90 which schedules among the element servers 12-1 to 12-N, and also comprises a dedicated communication path 91 which connects the master scheduler 90 and the element servers 12-1 to 12-N. The master scheduler 90 schedules among the element servers 12-1 to 12-N via the communication path 91, wherein each of the element servers 12-1 to 12-N operates pursuant to instructions form the master scheduler 90.

In the embodiment of FIG. 9, the master scheduler 90 generates the timing signal for synchronizing the element servers 12-1 to 12-N to each other, while the communication path 91 serves to transfer the timing signal to each of the element servers 12-1 to 12-N, which operate in response to the timing signal.

In order to enhance the accuracy of the inter-server scheduling, it is preferable to synchronize the operations of the element servers 12-1 to 12-N to each other. Herein, the timing signal generated by the master scheduler 90 does not require any precision in the level of the clock for operation of the element servers 12-1 to 12-n, because the purpose of the scheduling is only to access the disk apparatuses. The interval holds for the timing signal, and includes the average period of time necessary to read out of the disk apparatus one block of the contents data which has undergone striping, and some margin.

In the embodiment of FIG. 9, the scheduling amount of the element servers 12-1 to 12-N is more accurately executed by the master scheduler 90, independently of the transfer operation of the contents by the element servers 12-1 to 12-N, thus improving the performance.

An access to the disk is managed at a time interval called a "slot". The disk access management is performed such that a single access is assigned to a single disk for one slot. When image data is transmitted to the network, the element server reads all of one stripe of data from the disk which is striped with one time slot, and sequentially sends them to the network.

In order to send a single video stream this operation is performed for every q slots (a frequency of disk access required for transmitting the data at a predetermined rate.)

Every element server includes a reservation table showing a reservation status of the disks in units of slots.

The reservation table is a two-dimensional table which is indexed by a slot number and a disk number, and outputs a number of the element server which is performed the reservation. The disks are accessed in accordance with the reservation table. For example, the maximum reproduction time is set to three hours, if a motion picture of three hours is the maximum. The data during the time slot exceeding the three hours is deleted. This reservation table is managed to be identical among all the element servers.

When a new reproduction request is issued from a user, the element server performs the reservation for using the disk which is performed as follows.

First, a list of numbers of the disks striped with respect to the contents requested by the user is obtained. Assume now that these disk numbers are L1, L2, . . . Ls.

This process may cause a collision of requests from a plurality of element servers. Therefore, in order to prevent a deadlock, the priority orders of the request are assigned among the element server such that a request having highest priority order can be reserved first.

A simplest assignment of the priority order is a fixed priority order. Assume now that in the following description the element server having the smallest number has the highest priority order.

In the interserver scheduling shown in FIG. 8, each server is provided with the reservation table. Furthermore, the reservation tables are updated with each other such that each table has identical contents.

The master scheduler shown in FIG. 9 is sufficient to have a single reservation table.

The disk reservation is performed for each slot as described above.

Hereinbefore, the video server system (the storage sharing-type distribution video server system) according to the present invention has been described. However, the present invention can be applied to the storage sharing-type distribution multimedia server system which manages multimedia data including at least one of the digitized image data, voice data, and text data, in addition to the video data.

We claim:

1. A storage sharing-type distribution server system comprising:

a shared disk array including a plurality of disk apparatuses, each disk apparatus storing contents having data through striping;

a plurality of servers for transferring information corresponding to a request from a client and including a network interface connected to a communication network accommodating the client, the plurality of disk apparatuses being arranged in the same number of disk groups as the plurality of servers sharing the shared disk array which respectively correspond to the plurality of servers, each of the contents being stored over the disk apparatuses in each of the disk groups through striping, the plurality of servers reading the contents cut of the respective disk groups in accordance with the request from the client, and outputting the contents to the communication network via the network interface, wherein a disk group corresponding to a broken server is inherited by one of the remaining servers; and a shared channel network which connects the plurality of servers and the shared disk array.

2. A system according to claim 1, wherein:

the plurality of disk apparatus are arranged in a plurality of disk groups, and each of the contents is stored over the disk apparatuses in each of the disk groups through striping, and the plurality of the servers includes communication means for use in exchanging information, and a specific server or all of the plurality of the servers schedule an access to each of the disk groups by holding information denoting usage conditions of each of the disk groups and select one of the disk groups for use in accordance with the contents requested by the client.

3. A system according to claim 1, further comprising a master scheduler connected to the plurality of servers via communication means for use in exchanging information, which schedules among the plurality of servers and allocates the request of the client among the plurality of servers, wherein the plurality of disk apparatus are arranged in a plurality of disk groups, and each of the contents is stored over the disk apparatuses in each of the disk groups through striping, and the plurality of element servers select one of the disk groups for use in accordance with the contents requested by the client.

4. A storage sharing-type distribution multimedia server system comprising:

a shared disk array including a plurality of disk apparatuses, each disk apparatus storing contents having data through striping, and a shared disk array including two connection ports;

first and second server groups, each server group includes a plurality of servers for transferring information corresponding to a request from a client and including a network interface for connecting to a communication network accommodating the client, the plurality of disk apparatuses being arranged in the same number of disk groups as the plurality of servers sharing the shared disk array which respectively correspond to the plurality of servers, each of the contents being stored cover the disk apparatuses in each of the disk groups through striping, the plurality of servers reading the contents out of the respective disk groups in accordance with the request from the client, including a network interface for connecting to a communication network accommodating the client, wherein a disk group corresponding to a broken server is inherited by one of the remaining servers;

a first shared channel network connected to one of the first and second server groups and one of the two connection ports of the plurality of disk apparatuses; and a second shared channel network connected to the other of the first and second server groups and the other of the two connection ports of the plurality of disk apparatuses, the first and second server groups sharing the shared disk array via the first and the second shared channel networks.

5. A system according to claim 4, wherein:

the plurality of disk apparatus are arranged in a plurality of disk groups, and each of the contents is stored over the disk apparatuses in each of the disk groups through striping, and the plurality of the element servers includes communication means for use in exchanging information, and a specific element server or all of the plurality of the element servers schedule an access to each of the disk groups by holding information denoting usage conditions of each of the disk groups and select one of the disk groups for use in accordance with the contents requested by the client.

6. A system according to claim 4, further comprising a master scheduler connected to the plurality of servers via communication means for use in exchanging information, which schedules among the plurality of servers and allocates the request of the client among the plurality of servers, wherein:

the plurality of disk apparatus are arranged in a plurality of disk groups, and each of the contents is stored over the disk apparatuses in each of the disk groups through striping, and the plurality of servers select one of the disk groups of use in accordance with the contents requested by the client.

7. A storage sharing-type distribution multimedia server system comprising:

m (m an integer greater than two) shared disk arrays, each shared disk array including a plurality of disk apparatuses storing contents having data through striping;

a plurality of servers for transferring information corresponding to a request from a client and included with a network interface connected to a communication network accommodating the client and m shared channel network interfaces, the plurality of disk apparatuses being arranged in the same number of disk groups over the m disk arrays as the plurality of servers sharing the disk array which respectively correspond to the plurality of servers, each of the contents being stored over the disk apparatuses in each of the disk groups through striping, the plurality of servers reading the contents out of the respective disk groups in accordance with the request from the client and outputting the contents to the communication network via the network interface, wherein a disk group corresponding to a broken server is inherited by one of the remaining servers; and m shared channel networks connected to the m shared channel network interfaces and the m shared disk arrays, the servers sharing the shared disk arrays via the m shared channel networks.

8. A system according to claim 7, wherein:

the plurality of disk apparatus are arranged in a plurality of disk groups over the m shared disk arrays, and each of the contents is stored over the disk apparatuses in each of the disk groups through striping, and the plurality of the servers includes communication means for use in exchanging information, and a specific server or all of the plurality of the element servers schedule an access to each of the disk groups by holding information denoting usage conditions of each of the disk groups and select one of the disk groups for use in accordance with the contents requested by the client.

9. A system according to claim 7, further comprising a master scheduler connected to the plurality of servers via communication means for use in exchanging information, which schedules among the plurality of servers and allocates the request of the client among the plurality of servers, wherein the plurality of disk apparatus are arranged in a plurality of disk groups over the m shared disk arrays, and each of the contents is stored over the disk apparatuses in each of the disk groups through striping, and the plurality of servers select one of the disk groups for use in accordance with the contents requested by the client.

10. A storage sharing-type distribution multimedia server system comprising:

m (m denotes integer greater than two) shared disk arrays, each shared disk array includes a plurality of disk apparatuses storing contents having data through striping and including two connection ports;

a first server group and a second server group, each server group including a plurality of servers which transfer information corresponding to a request from a client and including a network interface connected to a communication network accommodating the client and including m shared channel network interfaces, the plurality of disk apparatuses being arranged in the same number of disk groups over the m shared disk arrays as the plurality of servers sharing the shared disk array which respectively correspond to the plurality of servers, each of the contents being stored over the disk apparatuses in each of the disk groups through striping, the plurality of servers reading the contents out of the respective disk groups in accordance with the request from the client and outputting the contents to the communication network via the network interface, wherein a disk group corresponding to a broken server is inherited by one of the remaining servers;

m first shared channel networks which connected to the m shared channel network interfaces of one of the first and second server groups and one of the two connection ports of the plurality of disk apparatuses; and m second shared channel networks connected to the m shared channel network interfaces of the other of the first and second server groups and the other of the two ports of the plurality of disk apparatuses.

11. A system according to claim 10, wherein the plurality of disk apparatuses are arranged in a plurality of disk groups over the m shared disk arrays, and each of the contents is stored over the disk apparatuses in each of the disk groups through striping, and the plurality of the servers include with communication means for use in exchanging information, and a specific server or all of the plurality of the servers schedule an access to each of the disk groups by holding information denoting usage conditions of each of the disk groups and select one of the disk groups for use in accordance with the contents respected by the client.

12. A system according to claim 10, further comprising a master scheduler connected to the plurality of servers via communication means for use in exchanging information, which schedules among the plurality of servers and allocates the request of the client among the plurality of servers, wherein the plurality of disk apparatuses are arranged in a plurality of disk groups overt the m sharing disk arrays, and each of the contents is stored over the disk apparatuses in each of the disk groups through striping, and the plurality of servers select one of the disk groups for use in accordance with the contents requested by the client.

13. A storage sharing-type distribution multimedia server system comprising:

a plurality of unit configurations connected to each other in a chain, the plurality of unit configurations each including a plurality of servers, m (m denotes an integer greater than two) shared disk arrays, and m shared channel networks, wherein:

the plurality of servers for transferring information corresponding to a request from a client and including a network interface connected to a communication network accommodating the client and m shared channel network interfaces, the plurality of servers reading the contents out of the respective disk groups, wherein a disk group corresponding to a broken server is inherited by one of the remaining servers;

the m shared disk arrays each including a plurality of disk apparatuses storing contents having data through striping and including two connection ports, the plurality of disk apparatuses being arranged in the same number of disk groups over the m shared disk arrays as the plurality of servers sharing the shared disk array which respectively correspond to the plurality of servers, each of the contents being stored over the disk apparatuses in each of the disk groups through striping; and the plurality of shared channel networks each connected to the m shared channel networks of the plurality of servers and one of the two connection ports of the plurality of disk apparatus, wherein:

one of the two connection ports of the plurality of disk apparatuses in a unit configuration is connected to a shared channel network in the unit configuration and the other of the two connection ports of the plurality of disk apparatus in the unit configuration is connected to a shared channel network in an adjacent unit configuration.

14. A system according to claim 13, wherein:

the plurality of disk apparatuses are arranged in a plurality of disk groups over the m shared disk arrays, and each of the contents is stored over the disk apparatuses in each of the disk groups through striping, and the plurality of the servers includes communication means for use in exchanging information, and a specific server or all of the plurality of the servers schedule an access to each of the disk groups by holding information denoting usage conditions of each of the disk groups and select one of the disk groups for use in accordance with the contents requested by the client.

15. A system according to claim 13, further comprising a master scheduler connected to the plurality of servers via communication means for use in exchanging information, which schedules among the plurality of servers and allocates the request of the client among the plurality of servers, wherein:

the plurality of disk apparatuses are arranged in a plurality of disk groups over the m shared disk arrays, and each of the contents is stored over the disk apparatuses in each of the disk groups through striping, and the plurality of servers select one of the disk groups for use in accordance with the contents requested by the client.

16. A system according to claim 13, wherein the network interface includes FC-AL (Fiber Channel-Arbitrated Loop).

* * * * *